(12) United States Patent
Nichols et al.

(10) Patent No.: US 8,452,744 B2
(45) Date of Patent: May 28, 2013

(54) SYSTEM AND METHOD FOR ANALYZING LOCKED FILES

(75) Inventors: Tony Nichols, Erie, CO (US); Michael Burtscher, Longmont, CO (US)

(73) Assignee: Webroot Inc., Broomfield, CO (US)

( * ) Notice: Subject to any disclaimer, the term of this patent is extended or adjusted under 35 U.S.C. 154(b) by 48 days.

(21) Appl. No.: 11/145,592

(22) Filed: Jun. 6, 2005

(65) Prior Publication Data
US 2006/0277182 A1    Dec. 7, 2006

(51) Int. Cl.
*G06F 17/00*    (2006.01)

(52) U.S. Cl.
USPC .......................................................... 707/705

(58) Field of Classification Search
USPC ..... 707/205, 8, 2, 101, 705, 999.001; 726/24; 713/187, 188
See application file for complete search history.

(56) References Cited

U.S. PATENT DOCUMENTS

| | | | |
|---|---|---|---|
| 5,623,600 A | 4/1997 | Ji et al. | |
| 5,684,875 A | 11/1997 | Ellenberger | |
| 5,809,138 A * | 9/1998 | Netiv ............................... | 726/23 |
| 5,920,696 A | 7/1999 | Brandt et al. | |
| 5,951,698 A | 9/1999 | Chen et al. | |
| 6,069,628 A | 5/2000 | Farry et al. | |
| 6,073,241 A | 6/2000 | Rosenberg et al. | |
| 6,092,194 A | 7/2000 | Touboul | |
| 6,154,844 A | 11/2000 | Touboul | |
| 6,167,520 A | 12/2000 | Touboul | |
| 6,173,291 B1 | 1/2001 | Jenevein | |
| 6,310,630 B1 | 10/2001 | Kulkarni et al. | |
| 6,374,363 B1 * | 4/2002 | Wu et al. ............................ | 714/6 |
| 6,397,264 B1 | 5/2002 | Stasnick et al. | |
| 6,405,316 B1 | 6/2002 | Krishnan et al. | |
| 6,460,060 B1 | 10/2002 | Maddalozzo, Jr. et al. | |
| 6,480,962 B1 | 11/2002 | Touboul | |
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |

(Continued)

FOREIGN PATENT DOCUMENTS

WO PCT/US2007/064489    9/2007
WO PCT/US2007/067084    11/2007

OTHER PUBLICATIONS

U.S. Appl. No. 10/956,578, filed Oct. 1, 2004, Steve Thomas.
U.S. Appl. No. 10/956,573, filed Oct. 1, 2004, Steve Thomas.

(Continued)

*Primary Examiner* — Mohammed R Uddin
(74) *Attorney, Agent, or Firm* — Sheridan Ross P.C.

(57) ABSTRACT

Systems and methods for scanning files for pestware on a protected computer are described. In one variation, when a file on a storage device is inaccessible via an operating system of the protected computer, a listing of a plurality of pointers for the file is located on the storage device. Each of the plurality of pointers in the listing points to a corresponding one of a plurality of locations on the storage device, and the storage device stores each of a plurality of portions of data for the file at a corresponding one of each of the plurality of locations. One or more of the plurality of portions for the data are accessed and analyzed, while the operating system continues to limit access to the file via the operating system, so as to determine whether the file is a pestware file.

18 Claims, 3 Drawing Sheets

U.S. PATENT DOCUMENTS

| | | | |
|---|---|---|---|
| 6,721,721 B1 * | 4/2004 | Bates et al. | 707/1 |
| 6,772,345 B1 | 8/2004 | Shetty | |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungek | |
| 6,910,134 B1 | 6/2005 | Maher et al. | |
| 6,965,968 B1 | 11/2005 | Touboul | |
| 7,055,008 B2 | 5/2006 | Niles et al. | |
| 7,058,822 B2 | 6/2006 | Edery et al. | |
| 7,107,617 B2 | 9/2006 | Hursey et al. | |
| 7,246,209 B2 | 7/2007 | Tran | |
| 7,266,843 B2 * | 9/2007 | Tarbotton et al. | 726/22 |
| 7,275,215 B2 * | 9/2007 | Werndorfer et al. | 715/752 |
| 7,284,273 B1 | 10/2007 | Szor | |
| 7,617,534 B1 | 11/2009 | Szor | |
| 7,996,903 B2 | 8/2011 | Sprowls | |
| 8,079,032 B2 | 12/2011 | Nichols | |
| 2002/0162015 A1 | 10/2002 | Tang | |
| 2002/0166063 A1 * | 11/2002 | Lachman et al. | 713/200 |
| 2003/0065943 A1 | 4/2003 | Geis et al. | |
| 2003/0074581 A1 | 4/2003 | Hursey et al. | |
| 2003/0079145 A1 * | 4/2003 | Kouznetsov et al. | 713/200 |
| 2003/0101381 A1 | 5/2003 | Mateev et al. | |
| 2003/0159070 A1 * | 8/2003 | Mayer et al. | 713/201 |
| 2003/0217287 A1 | 11/2003 | Kruglenko | |
| 2003/0229801 A1 * | 12/2003 | Kouznetsov et al. | 713/200 |
| 2003/0233566 A1 * | 12/2003 | Kouznetsov et al. | 713/200 |
| 2003/0233574 A1 * | 12/2003 | Kouznetsov et al. | 713/201 |
| 2004/0003276 A1 * | 1/2004 | Kouznetsov et al. | 713/200 |
| 2004/0010703 A1 * | 1/2004 | Kouznetsov et al. | 713/200 |
| 2004/0025042 A1 * | 2/2004 | Kouznetsov et al. | 713/200 |
| 2004/0030914 A1 | 2/2004 | Kelley et al. | |
| 2004/0034794 A1 * | 2/2004 | Mayer et al. | 713/200 |
| 2004/0064736 A1 | 4/2004 | Obrecht et al. | |
| 2004/0080529 A1 | 4/2004 | Wojcik | |
| 2004/0088570 A1 * | 5/2004 | Roberts et al. | 713/201 |
| 2004/0143763 A1 | 7/2004 | Radatti | |
| 2004/0148281 A1 * | 7/2004 | Bates et al. | 707/3 |
| 2004/0187023 A1 | 9/2004 | Alagna et al. | |
| 2004/0225877 A1 | 11/2004 | Huang | |
| 2005/0033975 A1 * | 2/2005 | Lahti et al. | 713/200 |
| 2005/0038697 A1 | 2/2005 | Aaron | |
| 2005/0138433 A1 | 6/2005 | Linetsky | |
| 2005/0149726 A1 * | 7/2005 | Joshi et al. | 713/164 |
| 2005/0154885 A1 | 7/2005 | Viscomi et al. | |
| 2005/0257266 A1 * | 11/2005 | Cook et al. | 726/23 |
| 2006/0031940 A1 * | 2/2006 | Rozman et al. | 726/27 |
| 2006/0075501 A1 * | 4/2006 | Thomas et al. | 726/24 |
| 2006/0101264 A1 * | 5/2006 | Costea et al. | 713/165 |
| 2006/0236396 A1 * | 10/2006 | Horne | 726/24 |
| 2006/0265761 A1 * | 11/2006 | Rochette et al. | 726/27 |
| 2006/0272021 A1 * | 11/2006 | Marinescu et al. | 726/24 |
| 2007/0094496 A1 * | 4/2007 | Burtscher | 713/164 |
| 2007/0094726 A1 * | 4/2007 | Wilson et al. | 726/22 |
| 2007/0168285 A1 * | 7/2007 | Girtakovskis et al. | 705/50 |
| 2007/0168694 A1 * | 7/2007 | Maddaloni et al. | 714/4 |
| 2007/0168982 A1 * | 7/2007 | Horne | 717/124 |
| 2007/0169191 A1 * | 7/2007 | Greene et al. | 726/22 |
| 2007/0169197 A1 * | 7/2007 | Horne | 726/24 |
| 2007/0226704 A1 * | 9/2007 | Nichols | 717/131 |
| 2007/0226800 A1 * | 9/2007 | Nichols | 726/24 |
| 2007/0261117 A1 | 11/2007 | Boney | |
| 2011/0289587 A1 | 11/2011 | Sprowls | |
| 2012/0005752 A1 | 1/2012 | Sprowls | |

OTHER PUBLICATIONS

U.S. Appl. No. 10/956,574, filed Oct. 1, 2004, Steve Thomas.
U.S. Appl. No. 11/145,593, filed Jun. 6, 2005, Tony Nichols et al.
U.S. Appl. No. 11/104,202, filed Apr. 12, 2005, Michael Burtscher.
Codeguru, Three Ways to Inject Your Code Into Another Process, by Robert Kuster, Aug. 4, 2003, 22 pgs.
Codeguru, Managing Low-Level Keyboard Hooks With the Windows API for VB .Net, by Paul Kimmel, Apr. 18, 2004, 10 pgs.
Codeguru, Hooking the Keyboard, by Anoop Thomas, Dec. 13, 2001, 6 pgs.
Illusive Security, Wolves in Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass a Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
"NTFSPROGS—TODO" [Online]; Aug. 2004; pp. 1-15; XP002448002; linus.file-systems.ntfs.devel; retrieved from the Internet: URL:http//ml.osdir.com/linus.file-systems.ntfs.devel/2004-08/msg00023.html; retrieved on Aug. 23, 2007.
Yi-Min Wang et al.; "Detecting Stealth Software with Strider Ghostbuster" Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.
Yurcik, William et al., A Planning Framework for Implementing Virtual Private Networks, Jun. 2001, IT Pro, IEEE, pp. 41-44.

* cited by examiner

SYSTEM AND METHOD FOR ANALYZING LOCKED FILES

RELATED APPLICATIONS

The present application is related to the following commonly owned and assigned applications: application Ser. No. 10/956,578, entitled System and Method for Monitoring Network Communications for Pestware; application Ser. No. 10/956,573, entitled System and Method For Heuristic Analysis to Identify Pestware; application Ser. No. 10/956,574, entitled System and Method for Pestware Detection and Removal; application Ser. No. 11/104,202, filed Apr. 12, 2005, entitled System and Method for Directly Accessing Data From a Data Storage Medium; application Ser. No. 11/145,593, filed Jun. 6, 2005, entitled System and Method for Neutralizing Locked Pestware Files, each of which is incorporated by reference in their entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect and remove pestware, but removing pestware from a system is frequently problematic because the system's operating system typically locks a pestware file when a pestware process associated with the pestware file is running in the system's memory. As a consequence, the operating system prevents existing pestware removal software from analyzing the locked file and/or deleting the pestware file.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention include systems and methods for scanning files on a protected computer for pestware. In one variation, a file on a storage device of the protected computer is identified as being inaccessible via an operating system of the protected computer. A listing of a plurality of pointers for the file are then located. Each of the plurality of pointers in the listing points to a corresponding one of a plurality of locations on the storage device, and the storage device stores each of a plurality of portions of data for the file at a corresponding one of each of the plurality of locations. While the operating system continues to limit access to the file via the operating system, at least one of the plurality of portions for the data are accessed and analyzed so as to determine whether the file is a potential pestware file.

In another embodiment, the invention may be characterized as a system for detecting pestware files on a file storage device of a protected computer including a pestware detection module that is configured to identify a file on the storage device that is inaccessible via an operating system of the protected computer. The detection module is also configured to locate, on the storage device, a listing of a plurality of pointers for the file. Each of the plurality of pointers in the listing points to a corresponding one of a plurality of locations on the storage device, and the storage device stores each of a plurality of portions of data for the file at a corresponding one of each of the plurality of locations. The detection module is configured to access and analyze, while the operating system continues to limit access to the file via the operating system, at least one of the plurality of portions for the data so as to determine whether the file is a potential pestware file.

In yet another embodiment, the invention may be characterized as a computer readable medium encoded with instructions for scanning pestware files from a storage device of a protected computer. The instructions in this embodiment in include instructions for identifying a file on the storage device that is inaccessible via an operating system of the protected computer and locating, on the storage device, a listing of a plurality of pointers for the file. Each of the plurality of pointers in the listing points to a corresponding one of a plurality of locations on the storage device, and the storage device stores each of a plurality of portions of data for the file at a corresponding one of each of the plurality of locations. The instructions also include instructions for accessing and analyzing, while the operating system continues to limit access to the file via the operating system, at least one of the plurality of portions for the data so as to determine whether the file is a potential pestware file.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

According to several embodiments, the present invention permits a file that is inaccessible via the operating system (e.g., because it is locked by the operating system) to be accessed, analyzed and removed. In other words, while a file remains inaccessible via the operating system (e.g., because the file is being executed), several embodiments of the present invention allow the locked file to be analyzed to determine if the file is a pestware file, and if it is, then to remove the ordinarily inaccessible file.

Figure 1:
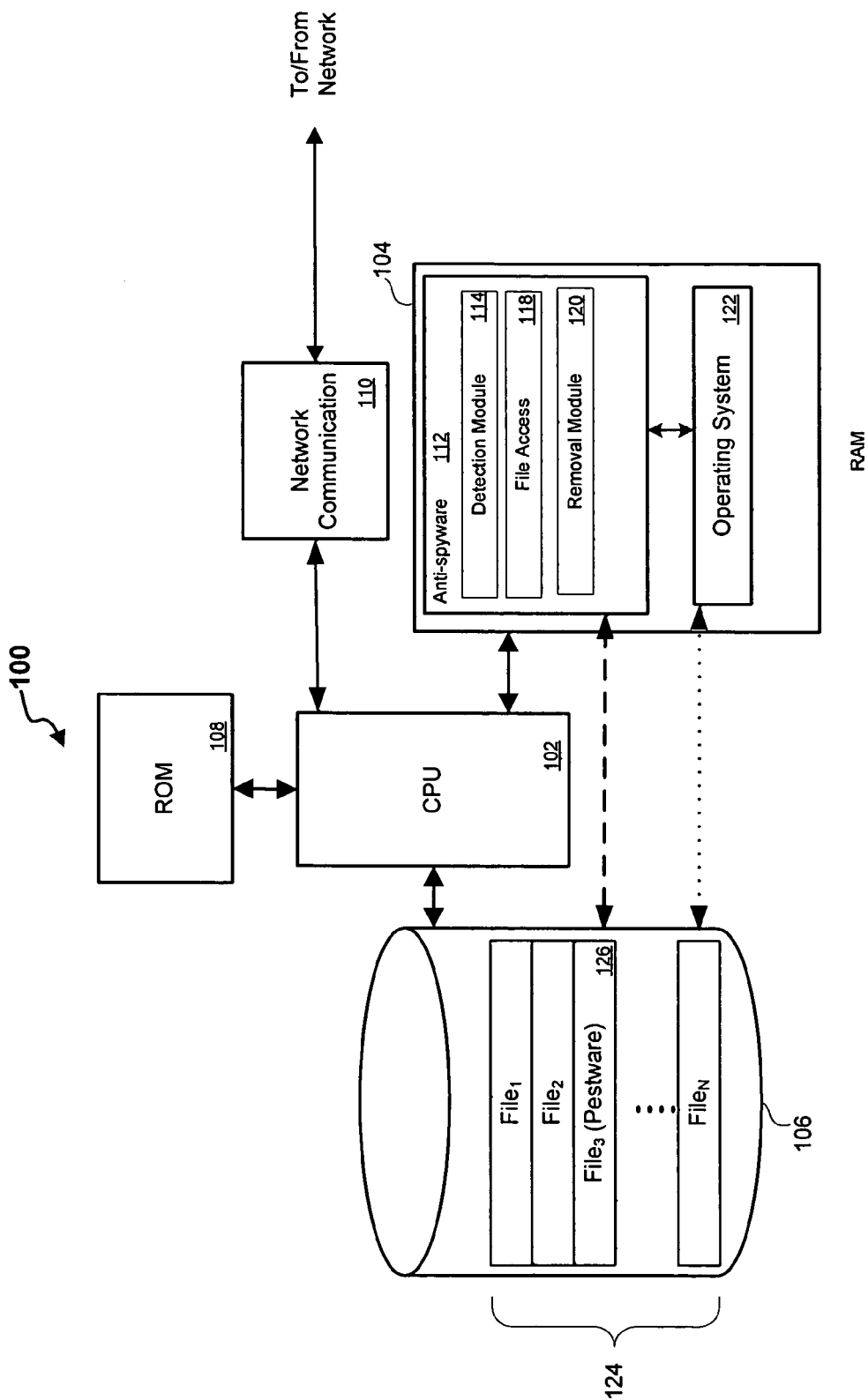
FIG. 1 illustrates a block diagram of a protected computer in accordance with one implementation of the present invention.

Referring first to FIG. 1, shown is a block diagram 100 of a protected computer/system in accordance with one implementation of the present invention. The term "protected computer" is used herein to refer to any type of computer system, including personal computers, handheld computers, servers, firewalls, etc. This implementation includes a CPU 102 coupled to memory 104 (e.g., random access memory (RAM)), a file storage device 106, ROM 108 and network communication 110.

As shown, the file storage device 106 provides storage for a collection of N files 124, which includes a pestware file 126. The file storage device 106 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 106, which is depicted for convenience as a single storage device, may be realized by multiple (e.g., distributed) storage devices.

As shown, an anti-spyware application 112 includes a detection module 114, a file access module 118 and a removal module 120, which are implemented in software and are executed from the memory 104 by the CPU 102. In addition, an operating system 122 is also depicted as running from memory 104.

The software 112 can be configured to operate on personal computers (e.g., handheld, notebook or desktop), servers or any device capable of processing instructions embodied in executable code. Moreover, one of ordinary skill in the art will recognize that alternative embodiments, which implement one or more components (e.g., the anti-spyware 112) in hardware, are well within the scope of the present invention.

Except as indicated herein, the operating system 122 is not limited to any particular type of operating system and may be operating systems provided by Microsoft Corp. under the trade name WINDOWS (e.g., WINDOWS 95, 98, 2000, NT and XP). Additionally, the operating system 122 may be an open source operating system such operating systems distributed under the LINUX trade name. For convenience, however, embodiments of the present invention are generally described herein with relation to WINDOWS-based systems. In light of the teaching disclosed herein, those of skill in the art can adapt these implementations for other types of operating systems or computer systems.

In accordance with several embodiments of the present invention, the file access module 118 enables data in one or more of the files 124 to be accessed notwithstanding one or more of the files 124 may be locked by the operating system 122. For example, when there is a pestware process running in memory 104 that is associated with the pestware file 126, the operating system 122 may lock the pestware file 126 so as to prevent a user of the protected computer 100 from accessing data of the file 126. As a consequence, in prior art systems, it would be very difficult to assess whether the pestware file 126 was indeed pestware. In several embodiments of the present invention, however, the files 124 are accessible so that data in one or more of the files 124 may be analyzed (e.g., by the detection module 114) so as to identify whether any of the files 124 are pestware files.

Figure 3:
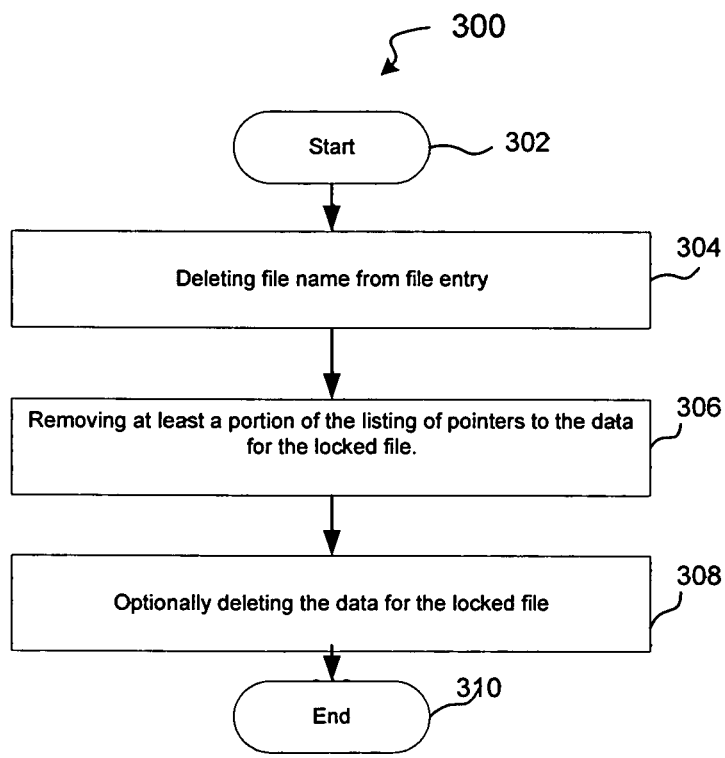
FIG. 3 is a flowchart of a method for removing files that are locked by an operating system of the protected computer in accordance with another embodiment of the present invention.

The removal module 120, as discussed further with reference to FIG. 3, enables files to be rendered inaccessible even if the operating system 122 is limiting access to the files. In operation for example, when a particular locked file is identified as pestware (e.g., the pestware file 126) the removal module 120 renders the pestware file inaccessible by removing pointers to data for the pestware file. In addition, the name for the file may be removed from the directory entry for the pestware file. In yet other variations, to further ensure data underlying the pestware file is inaccessible, some or all of the data associated with the pestware file is removed from the file storage device 106.

It should be recognized that the file access module 118 and the removal module 120 are identified as separate modules only for ease of description and the file access module 118 and the removal module 120 in several embodiments utilize the same components (e.g., the same collection of code) for carrying out similar functions.

Figure 2:
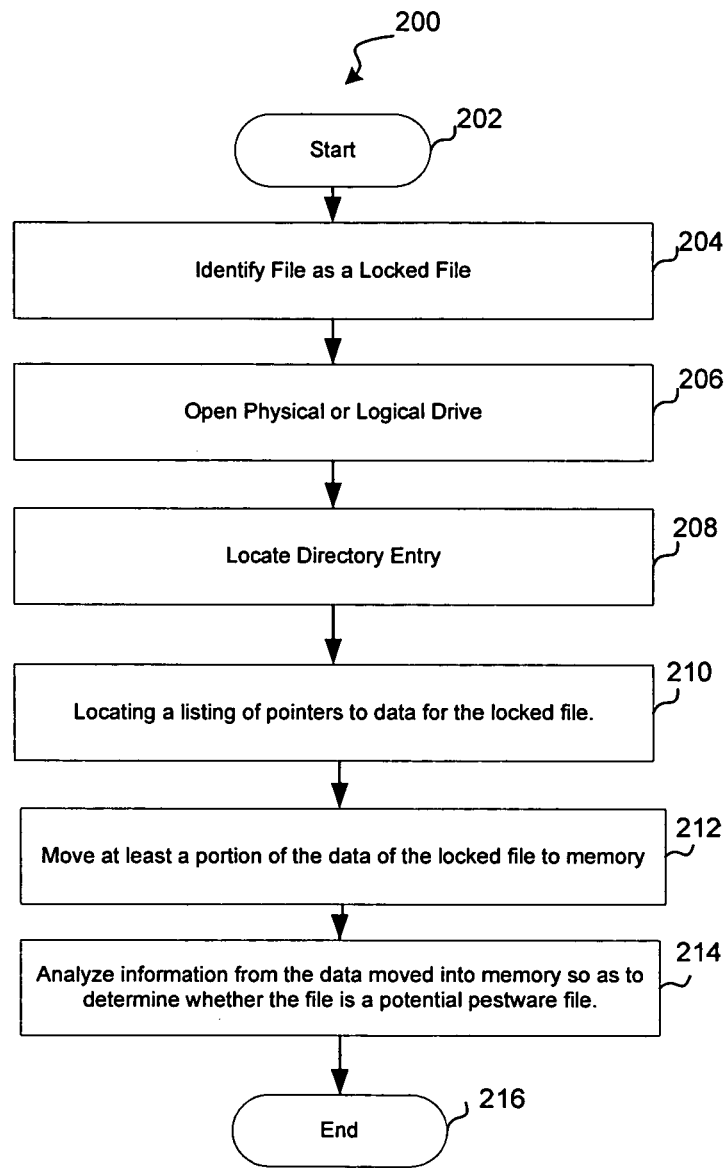
FIG. 2 is a flowchart of one method for accessing information from a plurality of files in accordance with an embodiment of the present invention.

Referring next to FIG. 2, shown is a flowchart depicting steps traversed in accordance with a method for accessing data from files in the data storage device 106. In the exemplary method, a file is initially identified as a locked file (e.g., the operating system 122 limits access to the file via the operating system's file access calls) (Blocks 202, 204).

In some embodiments, before steps are carried out to access data of a locked file, the file path (e.g, a fully qualified path (FQP)) for the file is identified, but this is not required. Next, a physical or logical drive where the locked files resides is opened for reading and writing (Block 206). In some instances, it is beneficial (when possible) to lock the volume so as to prevent the operating system 122 from doing any reading or writing while the file access module 118 is accessing data from the storage device 106.

In addition, in various embodiments, the content in cache of the protected computer that is associated with the locked file is flushed to the drive. This may be carried out as a safety measure so that is the file is determined to be pestware, and the file is removed (as discussed further in reference to FIG. 3) the file is not regenerated by the operating system 122.

In several embodiments, once a file is identified as a locked file and the information about the volume where the file resides is obtained, then the directory entry for the file is located (Block 208).

In order to locate the directory entry and access data from the locked file, information about where the volume's (i.e., the partition) files reside (e.g., C drive, D drive, etc.) is obtained. If the Physical Disk Mode is utilized, then sector zero, the partition table, is read so as to obtain the starting sectors for the volumes on the drive. In several embodiments, the Boot Record, which starts at logical sector zero, is accessed to obtain the BIOS Parameter Block (BPB). The BIOS parameter block includes the following useful information for both NTFS and FAT file systems:
  i. Bytes per sector
  ii. Sectors per cluster
  iii. Reserved sectors
  iv. Media type
  V. Hidden sectors
  vi. Total sectors in Volume (or partition).
The following three pieces of information are available from the bios parameter block in an NTFS system:
  vii. Logical cluster number for the MFT
  viii. Clusters per file record segment
  ix. Cluster per index block.
In a FAT system, the following three pieces of information are available from the BIOS parameter block:
  x. The number of File Allocation Tables, FAT
  xi. The number of root-directory entries.
  xii. The number of sectors per FAT When the storage device 106 is organized according to an NTFS file structure, in one embodiment, an iterative process of looking in subdirectories of the Fully Qualified Path is carried out until the directory entry of the locked file is located.

Specifically, in this embodiment, beginning with the root directory, each directory entry in the Directory Index is read and the master file table (MFT) record for each entry is accessed and placed into memory (e.g., memory location number one (M1)). The validity of each MFT file record is determined, and if it is not valid then the process is aborted. But, if the MFT file record of each entry is valid and the file name of the locked file is reached in the directory index, the file entry for the locked file is read from the directories index so as to obtain the MFT file record number for the locked file.

The MFT includes several pieces of information that are useful in this process of locating the directory entry of the locked file. As a consequence, in some embodiments, the MFT table is located by accessing the bios parameter block (BPB), and the first seven MFT File Record entries (0 . . . 6) are read into memory (e.g., memory location zero (M0)). The file record number 0 of the MFT includes information to locate all of the MFT File Record Locations and the MFT Bitmap Data Runs, which enable the clusters of the directory indexes to be located. File record number 6 contains the Data Bitmap Location on the drive, and file record number 5, which is the root directory entry, includes information to locate the Index Attribute for the MFT file record number 5.

To find the directory entry for the locked file in a FAT file structure, the first directory entry in the root directory is located along with the first cluster location for the first directory entry. If the first directory entry is not the locked file, then each successive directory entry (and its associated data cluster(s)) are located until the directory entry for the locked file is located.

When a directory entry occupies a single cluster, then the next directory entry is located simply by looking in that single cluster. In the event a directory entry occupies more than one cluster, however, then the FAT entries, which operate as pointers, are followed to each cluster associated with the directory entry until either an end of file (EOF) marker is located for the directory entry or the next directory entry is located.

Once the directory entry for the locked file is located (Block 208), then a listing of pointers to data for the locked file is located (Block 210). In the context of an NTFS file system, if the file's data resides within the MFT File Record itself, then a flag in the "Data Attribute" indicates whether the data for the file is resident or non-resident in the MFT file record. If the data for the locked file is resident in the MFT file record, then the actual data for the file will be within the Data Attribute itself. In addition, other attributes within the MFT are, for example, "File Name" and "File Information."

If the data for the locked file does not reside entirely within the MFT record for the file, then the listing of pointers, according to an exemplary embodiment, includes the Data Runs in the MFT record, which point to the clusters where the data for the file is stored on the storage device 106.

When the file system is a FAT system, one pointer includes a pointer to the first FAT entry in the File Allocation Chain, which is located by reading the directory entry of the locked file. Once the first FAT entry is located, pointers to the data for the locked file include the addresses in the FAT entries of the File Allocation Chain that identify the locations of data for the locked file and link the File Allocation Chain together.

Once the location of data for the locked file is located, at least a portion of the data of the locked file is moved to memory (Block 212). The data from the locked file that is in memory is then analyzed so as to determine whether the locked file is a potential pestware file (Block 214).

In several embodiments, the detection module 114, it is responsible for detecting pestware or pestware activity on the protected computer 100 based upon the information received from the data associated with the locked file. In one embodiment for example, the detection module compares a representation of known pestware files (e.g., a cyclical redundancy check (CRC) of a portion of a known pestware file) with a representation (e.g., CRC) of a portion of the locked file. In one variation, only 500 Bytes of information are retrieved from data associated with the locked file and a CRC of the 500 Bytes of information retrieved from the file is compared with the known pestware definitions. If the 500 Bytes of retrieved information indicates the file is a potential pestware file, then a more thorough analysis (e.g., an analysis of the entire file) may be conducted. In this way, the comparison of each file with definitions of pestware files is expedited. Various techniques for detecting pestware are disclosed in the above-identified and related application entitled: System and Method for Monitoring Network Communications for Pestware.

Referring next to FIG. 3, shown is a flowchart, which depicts exemplary steps carried out when deleting a locked file in accordance with an exemplary embodiment of the present invention. As shown in FIG. 3, the name of the locked file is initially deleted from the file entry (Blocks 302, 304).

In the context of an NTFS file system, the number of file names associated with the locked file are given in the MFT File Record. In the exemplary embodiment, all of the file names (there will never be more than two or less than one file name) associated with the locked file are located and changed. If the locked file has a Short File Name (SFN) and a Long File Name (LFN) then there are two file names. In one embodiment, a copy of the Directory Index is stored in memory (e.g, memory 104) and the filename(s) are located and removed from the copy of the Directory Index. Next. the updated MFT entry is written back to the same location that it was read from before the changed copy of the Directory Index (i.e., the copy stored in memory) is written to the drive.

If the file system is a FAT file system, then each of its filenames (e.g., long file names and short file names) are deleted by adding the American Standard Code for Information Interchange (ASCII) character 0xE5. Optionally, for added security, all of the characters except for the 0xE5 character are overwritten with zeros.

As shown in FIG. 3, at least a portion of the listing of pointers to the data for the locked file are altered so as to prevent the data from being accessed and executed (Block 308). In an NTFS system, the pointers identified at Block 210 are altered by reading into memory, portions of the Data Bitmap that are associated with the locations of Data Runs identified in Block 210 (i.e., the Data Runs from entry 6 of the MFT) and zeroing each correlating-bit in the stored portion of the Data Bitmap that is associated with each cluster within the Data Runs. The altered portion of Data Bitmap is then written back to the drive. The altered Data Bitmap tells the operating system 122 that the data clusters associated with the data runs of the locked file are no longer in use, and as a consequence, the operating system will no longer be able to access the data for the locked file.

Next, in the exemplary embodiment, the MFT Bitmap is read into memory and the bit that tells the operating system 122 about the availability of the MFT Entry is zeroed out so as to indicate the MFT entry for the locked file is now available for reuse. The MFT Bitmap is then written back onto the drive.

In the context of a FAT system, the listing of pointers to the data for the locked file include the FAT entries for the locked file. In order to alter the listing of pointers, the FAT table is read into memory and these FAT entries for the locked file are zeroed out and the FAT table is rewritten back to the drive. In the event there is more than one FAT table on the drive, the entries for the locked file in each FAT table are zeroed out.

As shown in FIG. 3, the data on the storage device 106 associated with the locked file may be optionally deleted (e.g., to improve privacy). (Block 308). In an NTFS system, for example, one or more of the data clusters associated with the Data Runs may be erased, and in a FAT system one or more of the data clusters for each of the FAT entries in the FAT chain may be erased.

In conclusion, the present invention provides, among other things, a system and method for managing pestware. Those skilled in the art can readily recognize that numerous variations and substitutions may be made in the invention, its use and its configuration to achieve substantially the same results as achieved by the embodiments described herein.

For example, the processes depicted in FIGS. 2 and 3 are shown in separate drawings merely to show that each process may be implemented separately and independently, but these process may be integrated into one seamless process. It should also be recognized that the order of many of the steps described with reference to FIGS. 2 and 3 may be varied without adversely affecting the performance of implementations of the present invention. Moreover, one of ordinary skill in the art will recognize that a file may be rendered inaccessible for practical purposes by implementing less than all of the steps enumerated in FIG. 3. Accordingly, there is no intention to limit the invention to the disclosed exemplary forms. Many variations, modifications and alternative constructions fall within the scope and spirit of the disclosed invention as expressed in the claims.

What is claimed is:

1. A method for scanning files located on a storage device of a protected computer for pestware, the method comprising:
    identifying, using an application, a file on the storage device that is inaccessible to the application via an operating system of the protected computer, wherein the file is made inaccessible to the application by the operating system before the identifying, the application being separate from the operating system;
    locating, on the storage device while the file remains inaccessible to the application via the operating system, a listing of a plurality of pointers for the file, wherein each of the plurality of pointers in the listing points to a corresponding one of a plurality of locations on the storage device, and the storage device stores each of a plurality of portions of data for the file at a corresponding one of each of the plurality of locations;
    accessing, using the application while the file remains inaccessible to the application via the operating system, at least one of the plurality of portions of data;
    analyzing, while the file remains inaccessible to the application via the operating system, information from the at least one of the plurality of portions of data so as to determine whether the file is a potential pestware file; and
    altering the listing of a plurality of pointers in response to the file being identified as a pestware file and while the operating system continues to limit access to the file via the operating system;
    wherein altering the listing of a plurality of pointers comprises at least one of: (i) reading the file allocation table (FAT) into memory and zeroing out the FAT entries associated with the locked file; and (ii) deleting the locked file name from a file entry and removing at least a portion of the listing of pointers to the data for the locked file.

2. The method of claim 1, including copying the at least one of the plurality of portions of data to a second file on the storage device, and wherein the analyzing information includes analyzing information from the second file.

3. The method of claim 1, wherein the analyzing includes placing the information in volatile memory and analyzing the information from the volatile memory.

4. The method of claim 1, wherein the listing of the plurality of pointers is located in a data bitmap, and wherein files on the storage device are organized in accordance with a New Technology File System (NTFS).

5. The method of claim 1, wherein the listing of the plurality of pointers are entries in a file allocation table (FAT).

6. The method of claim 1, wherein the locating includes locating a directory entry for the file.

7. A system for detecting pestware files on a file storage device of a protected computer, the protected computer including an operating system, the system comprising:
    a processor; and
    a memory containing a plurality of program instructions, the plurality of program instructions including:
    a pestware detection module configured to cause the processor to:
    identify, using the pestware detection module, a file on the storage device that is inaccessible to the pestware detection module via an operating system of the protected computer, wherein the file is made inaccessible to the pestware detection module before the file is identified, the application being separate from the operating system;
    locate, on the storage device while the file remains inaccessible to the pestware detection module via the operating system, a listing of a plurality of pointers for the file, wherein each of the plurality of pointers in the listing points to a corresponding one of a plurality of locations on the storage device, and the storage device stores each of a plurality of portions of data for the file at a corresponding one of each of the plurality of locations;
    access, using the pestware detection module while the file remains inaccessible to the pestware detection module via the operating system, at least one of the plurality of portions of data for the data;
    analyze, while the file remains inaccessible to the pestware detection module via the operating system, information from the at least one of the plurality of portions of data so as to determine whether the file is a potential pestware file; and a pestware removal module configured to cause the processor to alter the listing of a plurality of pointers in response to the file being identified as a pestware file and while the operating system continues to limit access to the file via the operating system, wherein altering the listing of a plurality of pointers comprises at least one of: (i) reading the file allocation table (FAT) into memory and zeroing out the FAT entries associated with the locked file; and (ii) deleting the locked file name from a file entry and removing at least a portion of the listing of pointers to the data for the locked file.

8. The system of claim 7, wherein the pestware detection module is configured to cause the processor to copy the at least one of the plurality of portions of data to a second file on the storage device, and wherein the analyzing information includes analyzing information from the second file.

9. The system of claim 7, wherein the pestware detection module is configured to cause the processor to place the information in volatile memory and analyze the information from the volatile memory.

10. The system of claim 7, wherein the listing of the plurality of pointers is located in a data bitmap, and wherein files on the storage device are organized in accordance with a New Technology File System (NTFS).

11. The system of claim 7, wherein the listing of the plurality of pointers are entries in a file allocation table (FAT).

12. The system of claim 7, wherein the pestware detection module is configured to cause the processor to locate a directory entry for the file.

13. A non-transitory computer-readable storage medium comprising a plurality of program instructions executable by a processor for scanning pestware files on a storage device of a protected computer, the plurality of program instructions including instructions for:

identifying, using a portion of the plurality of program instructions a file on the storage device that is inaccessible to the plurality of program instructions via an operating system of the protected computer, wherein the file is made inaccessible to the plurality of program instructions by the operating system before the identifying, the application being separate from the operating system:

locating, on the storage device while the file remains inaccessible via the operating system, a listing of a plurality of pointers for the file, wherein each of the plurality of pointers in the listing points to a corresponding one of a plurality of locations on the storage device, and the storage device stores each of a plurality of portions of data for the file at a corresponding one of each of the plurality of locations;

accessing, while the file remains inaccessible to the plurality of program instructions via the operating system, at least one of the plurality of portions for the data;

analyzing, while the file remains inaccessible to the plurality of program instructions via the operating system, information from the at least one of the plurality of portions of data so as to determine whether the file is a potential pestware file; and altering the listing of a plurality of pointers in response to the file being identified as a pestware file and while the operating system continues to limit access to the file via the operating system;

wherein altering the listing of a plurality of pointers comprises at least one of: (i) reading the file allocation table (FAT) into memory and zeroing out the FAT entries associated with the locked file; and (ii) deleting the locked file name from a file entry and removing at least a portion of the listing of pointers to the data for the locked file.

14. The non-transitory computer-readable storage medium of claim 13, wherein the plurality of program instructions include instructions for copying the at least one of the plurality of portions of data to a second file on the storage device, and wherein the analyzing information includes analyzing information from the second file.

15. The non-transitory computer-readable storage medium of claim 13, wherein the instructions for analyzing include instructions for placing the information in volatile memory and analyzing the information from the volatile memory.

16. The non-transitory computer-readable storage medium of claim 13, wherein the listing of the plurality of pointers is located in a data bitmap, and wherein files on the storage device are organized in accordance with a New Technology File System (NTFS).

17. The non-transitory computer-readable storage medium of claim 13, wherein the listing of the plurality of pointers are entries in a file access table (FAT).

18. The non-transitory computer-readable storage medium of claim 13, wherein the instructions for locating include instructions for locating a directory entry for the file.

\* \* \* \* \*